United States Patent
Andresen

[19]

[11] Patent Number: 6,073,020
[45] Date of Patent: *Jun. 6, 2000

[54] METHOD AND APPARATUS FOR INTER-NODE HANDOFF OF A RADIO FREQUENCY COMMUNICATION UNIT

[75] Inventor: Michael J. Andresen, Apache Junction, Ariz.

[73] Assignee: Motorola, Inc., Schaumburg, Ill.

[ * ] Notice: This patent is subject to a terminal disclaimer.

[21] Appl. No.: 09/045,576

[22] Filed: Mar. 20, 1998

Related U.S. Application Data

[63] Continuation-in-part of application No. 08/617,723, Apr. 1, 1996, Pat. No. 5,761,608.

[51] Int. Cl.⁷ .................................................... H04Q 7/20
[52] U.S. Cl. .......................................... 455/436; 455/13.1
[58] Field of Search ................................ 455/12.1, 13.1, 455/33.2, 132, 62, 436, 437, 438, 442, 443, 427

[56] References Cited

U.S. PATENT DOCUMENTS

| | | |
|---|---|---|
| 5,293,423 | 3/1994 | Dahlin et al. ............................. 380/48 |
| 5,440,562 | 8/1995 | Cutler, Jr. ............................... 370/95.1 |
| 5,479,409 | 12/1995 | Dupuy et al. .......................... 370/95.3 |
| 5,761,608 | 6/1998 | Andresen et al. ..................... 455/13.1 |

*Primary Examiner*—Daniel S. Hunter
*Assistant Examiner*—Darnell R Armstrong
*Attorney, Agent, or Firm*—Sherry J. Whitney; Jeff D. Limon; Frank J. Bogacz

[57] ABSTRACT

A method for a radio frequency communication unit (110) (CU) to hand off from a losing node (120) to an alternate node (122) estimates one or more alternate node uplink times (240) and alternate node uplink frequencies (242), which the alternate node uplink signal comprises. During handoff, the CU (110) ceases communications with the losing node (120) and immediately begins communications with the alternate node (122) using the uplink time and uplink frequency. A CU apparatus (300) uses a processor (302) for carrying out calculations necessary for estimating the alternate node uplink time and frequency. Information necessary for the calculations, such as a downlink signal time-of-arrival and Doppler offset, are collected by a CU receiver (306). The CU receiver (306) and a CU transmitter (304) are used to support downlink signals (142) and uplink signals (140), respectively, between the CU (110) and a node (120, 122).

13 Claims, 3 Drawing Sheets

METHOD AND APPARATUS FOR INTER-NODE HANDOFF OF A RADIO FREQUENCY COMMUNICATION UNIT

The present application is a continuation-in-part application of a U.S. patent application having Ser. No. 08/617,723, filed on Apr. 1, 1996 now U.S. Pat. No. 5,761,608 entitled "METHOD AND APPARATUS FOR INTER-NODE HANDOFF OF A RADIO FREQUENCY COMMUNICATION UNIT", and which is assigned to the same assignee as the present application.

FIELD OF THE INVENTION

This invention relates generally to radio telecommunications and, more particularly, to handing off a radio frequency communication unit from one system node to another system node.

BACKGROUND OF THE INVENTION

During a call within a mobile communication system, a communication unit (CU) maintains a channel with a system antenna, or "system node", which provides communication services to the area in which the CU is located. A system node can be, for example, a ground-based cellular base station or a satellite. When the CU transitions into an area covered by a different system node, the CU must be handed off to the different system node or the call will be dropped.

As used herein, the system node whose coverage area the CU is leaving (i.e., the node from which the CU is being handed off) is referred to as the "losing node". The system node whose coverage area the CU is entering (i.e., the node to which the CU is being handed off) is referred to as the "gaining node". Handoff between a losing node and a gaining node is referred to herein as an "inter-node handoff".

A CU transitions into the coverage area of a gaining node due to the relative motion of the system nodes to the CU. For example, where system nodes are stationary (e.g., ground-based system nodes or satellite system nodes with earth-fixed coverage areas), the CU would have physically to relocate to enter the coverage area of the gaining node. Where the coverage areas of system nodes move relative to the surface of the earth (e.g., non-geosynchronous satellite system nodes with satellite-fixed coverage areas), the CU does not need to move to enter the coverage area of the gaining node. In such a case, the coverage area moves over the CU.

Prior art methods of handing off a CU from a losing node to a gaining node use either "make-before-break" or "break-before-make" handoff sequences. A "make-before-break" handoff sequence requires a CU to be capable of sustaining two simultaneous traffic channels during handoff: one with the losing node and one with the gaining node. When a handoff is in progress, the CU maintains the traffic channel with the losing node while establishing a new traffic channel with the gaining node. Once the new traffic channel is established, the CU drops the traffic channel with the losing node. The "make-before-break" handoff sequence is undesirable because the CU requires extra hardware to maintain the two simultaneous traffic channels.

A prior art "break-before-make" handoff sequence does not require a CU to maintain simultaneous traffic channels. When a handoff is in progress, the traffic channel to the losing node is dropped, the CU synchronizes to the gaining node, and a new traffic channel to the gaining node is established. Synchronization before traffic packet transmission is necessary in a mobile system because the Doppler offset and propagation delay between the CU and the gaining node requires the CU to adjust its packet transmission frequency and time prior to sending traffic packets. The Doppler offset and propagation delay are determined during synchronization and, because both vary during operation, also during maintenance of a traffic channel.

A drawback to the "break-before-make" handoff sequence is that a condition referred to as "drop-out" occurs during the time period when the CU is synchronizing with the gaining node. During drop-out, voice or data traffic packets from the CU are not received by any system node. Thus, a break in the voice or data transmission stream results. This break results in diminished voice quality and/or corrupted data.

What is needed is a method and apparatus for handing off a CU from a losing node to a gaining node which does not require additional CU hardware in order simultaneously to maintain multiple traffic channels. Further needed is a method and apparatus for handing off a CU which does not result in dropped CU voice and/or data packets.

DETAILED DESCRIPTION OF THE DRAWINGS

The method and apparatus of the present invention enables a communication unit (CU) to be handed off from a losing node to a gaining node without maintaining multiple traffic channels. In addition, the method and apparatus of the present invention enables a CU to be handed off without dropping CU voice and/or data packets. The method and apparatus achieves these advantages over the prior art by using a "simultaneous make-break" handoff sequence. The simultaneous make-break handoff involves dropping the traffic channel to the losing node while instantly establishing the traffic channel to the gaining node. The method and apparatus of the present invention makes this possible by eliminating the necessity for synchronization with the gaining node prior to sending traffic packets to the gaining node.

A preferred embodiment of the method and apparatus of the present invention is described herein using an exemplary non-geosynchronous satellite communication system having satellite-fixed coverage areas. Although the description depicts such a satellite communication system, the method and apparatus of the present invention could also be used in a ground-based communication system, a geosynchronous satellite system, a satellite system which uses earth-fixed coverage areas, or a communication system which uses a combination of the aforementioned types of system nodes. Any system which gives rise to Doppler shifts, propagation delays, and the need for CU handoffs between system nodes could employ the method and apparatus of the present invention. Therefore, the description of a satellite communication system is for exemplary purposes only and should not be construed to limit the scope of the present invention.

Figure 1:
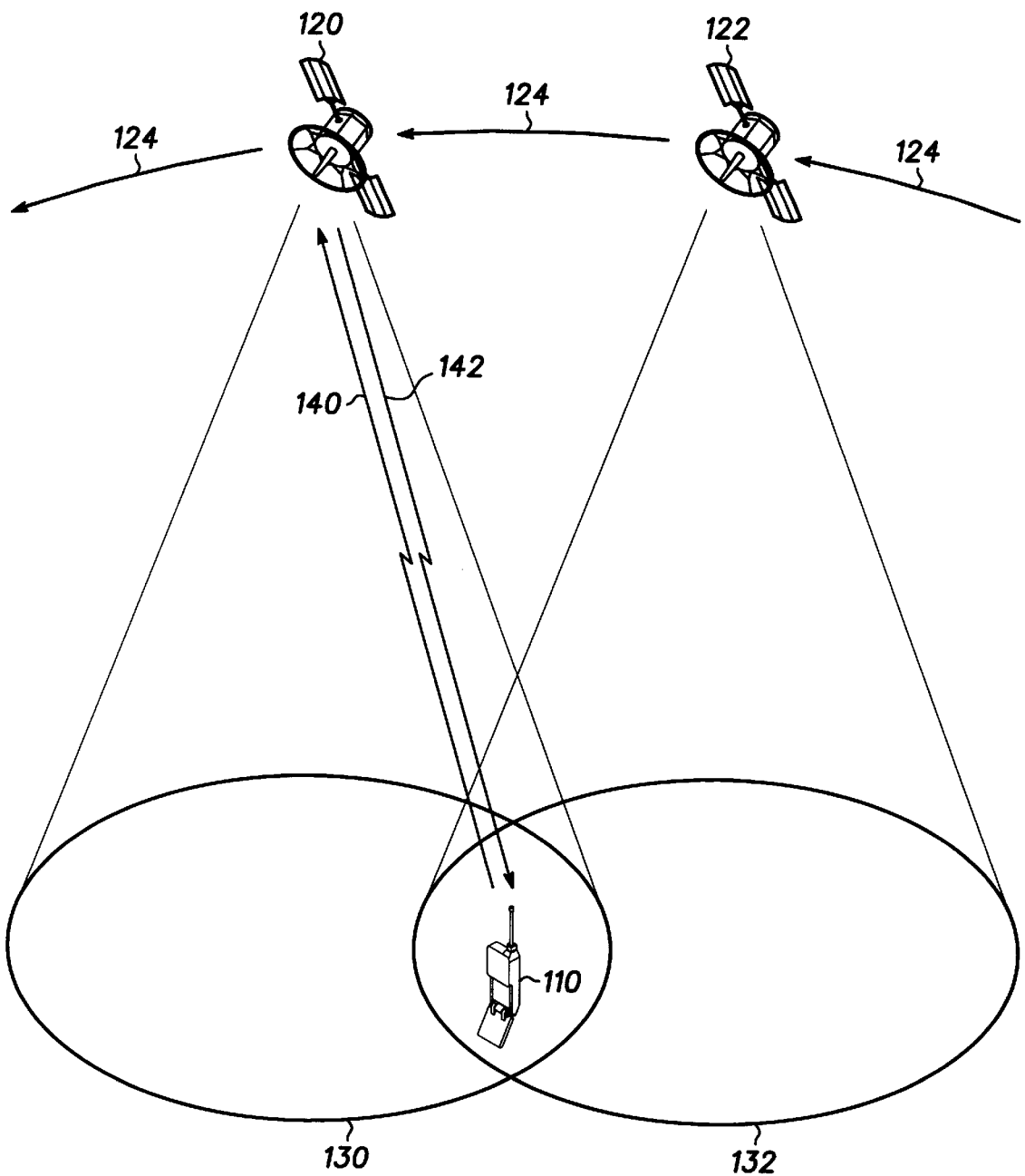
FIG. 1 illustrates a radio telecommunication system in accordance with a preferred embodiment of the present invention.

FIG. 1 illustrates radio telecommunication system 100 in accordance with a preferred embodiment of the present invention. System 100 comprises one or more CUs 110, and at least two satellites 120, 122 which function as system nodes. CUs 110 can be any radio frequency (RF) telecommunication device such as, for example, stationary or mobile radios, cellular telephones, facsimile, or data devices.

Although communication system 100 functions to provide communication between CU 110 and other communication devices, hardware which is not essential to the description of the method and apparatus of the present invention is not shown for ease of description. Such hardware (not shown) could include, for example, switching gateways, public switched telephone networks (PSTN), system control facilities, and other RF or hard-wired communication terminals.

In a preferred embodiment, satellites 120, 122 are non-geosynchronous satellites which are shown to travel along path 124, although satellites 120, 122 could travel along different paths. As described previously, the method and apparatus of the present invention, in alternate embodiments, could use geosynchronous satellites, ground-based system nodes, or a combination of non-geosynchronous, geosynchronous, and/or ground-based system nodes.

Satellites 120, 122 are designed to provide communications capabilities within coverage areas 130, 132. Thus, as long as CU 110 is located within coverage area 130, CU 110 normally would be able to maintain a channel with satellite 120. In a preferred embodiment, coverage areas 130, 132 are "satellite-fixed", meaning that coverage areas 130, 132 move across the surface of the earth in relation to the movement of satellites 120, 122. As was described previously, in an alternate embodiment, satellites 120, 122 could have coverage areas 130, 132 which are "earth-fixed", meaning that the centers of coverage areas 130, 132 do not substantially move with respect to the surface of the earth, although the shape of coverage areas 130, 132 could change as satellites 120, 122 move in their orbits.

Satellites 120, 122 communicate with CU 110 over uplink 140 and downlink 142 which carry uplink signals and downlink signals, respectively. Uplink 140 is an RF carrier of voice and/or data packets emanating from CU 110 and destined for satellite 120. Downlink 142 is an RF carrier of voice and/or data packets emanating from satellites 120, 122 and destined for CU 110. Although the terms "uplink" and "downlink" are used, they are not meant to limit the method and apparatus of the present invention to embodiments where system nodes are at higher elevations with respect to CU 110. The terms are meant equally to apply to embodiments, such as systems using ground-based system nodes, where system nodes are at equal or lower elevations with respect to CU 110.

As described previously, CU 110 and coverage areas 130, 132 often move relative to each other, whether by motion of CU 110, by motion of coverage areas 130, 132, or motion of both. In a preferred embodiment, where satellites 120, 122 move along path 124, satellite-fixed coverage areas 130, 132 move with respect to the surface of the earth and, thus, with respect to CUs 110. In FIG. 1, CU 110 is shown to be located in both coverage areas 120, 122. However, as satellites 120, 122 move along path 124, coverage area 130 will no longer encompass CU 110. Instead, coverage area 132 will encompass CU 110. Thus, a handoff of the CU from satellite 120 to satellite 122 will be necessary in order to maintain a communication link with CU 110. In this situation, satellite 120 is a "losing node" and satellite 122 is a "gaining node".

Although the terms "losing node" and "gaining node" are used herein, they are not meant to indicate that the losing node is traveling away from the CU and the gaining node is traveling toward the CU, even though this is a likely handoff scenario. Instead, the losing node means the node that is losing the link with the CU during handoff, and the gaining node means the node that is gaining the link with the CU during handoff.

The handoff must take into account the fact that the Doppler offset and propagation delay between satellite 120 and CU 110 will most likely differ from the Doppler offset and propagation delay between satellite 122 and CU 110. Doppler offset and propagation delay are important parameters which CU 110 uses to synchronize with satellites 120. CU 110 must adjust its transmit and receive frequencies to compensate for the Doppler offset between CU 110 and a system node. Otherwise CU 110 cannot accurately and successfully transmit and receive voice and/or data packets. Similarly, CU 110 must adjust its transmit and receive times to compensate for the propagation delay between CU 110 and a system node so that CU 110 can successfully and accurately transmit and receive voice and/or data packets.

In prior art systems, Doppler offset and propagation delay between a CU and a gaining satellite are evaluated and compensated for during a synchronization procedure which precedes any exchange of voice and/or data traffic packets. As will be described below, the method and apparatus of the present invention eliminates the need for a synchronization procedure between CU 110 and gaining satellite 122. This enables CU 110 to establish a new traffic channel with gaining satellite 122 simultaneously with dropping the traffic channel with losing satellite 120. This simultaneous make-break handoff procedure results in no dropped uplink traffic packets during handoff, and does not require additional CU hardware.

In a preferred embodiment, satellites 120, 122 are synchronized in time and frequency. Thus, the system clocks and channel frequency settings for each satellite 120, 122 are substantially the same, except for clock and frequency errors which might result from clock/frequency drift or hardware inaccuracies and malfunctions. The time to which satellites 120, 122 are synchronized is referred to herein as the "system time". Similarly, a channel frequency setting to which satellites 120, 122 are synchronized is referred to herein as the "system frequency". Although only one system time and system frequency are used herein for exemplary purposes, multiple synchronized system times and system frequencies might be employed by a communication system.

Figure 2:
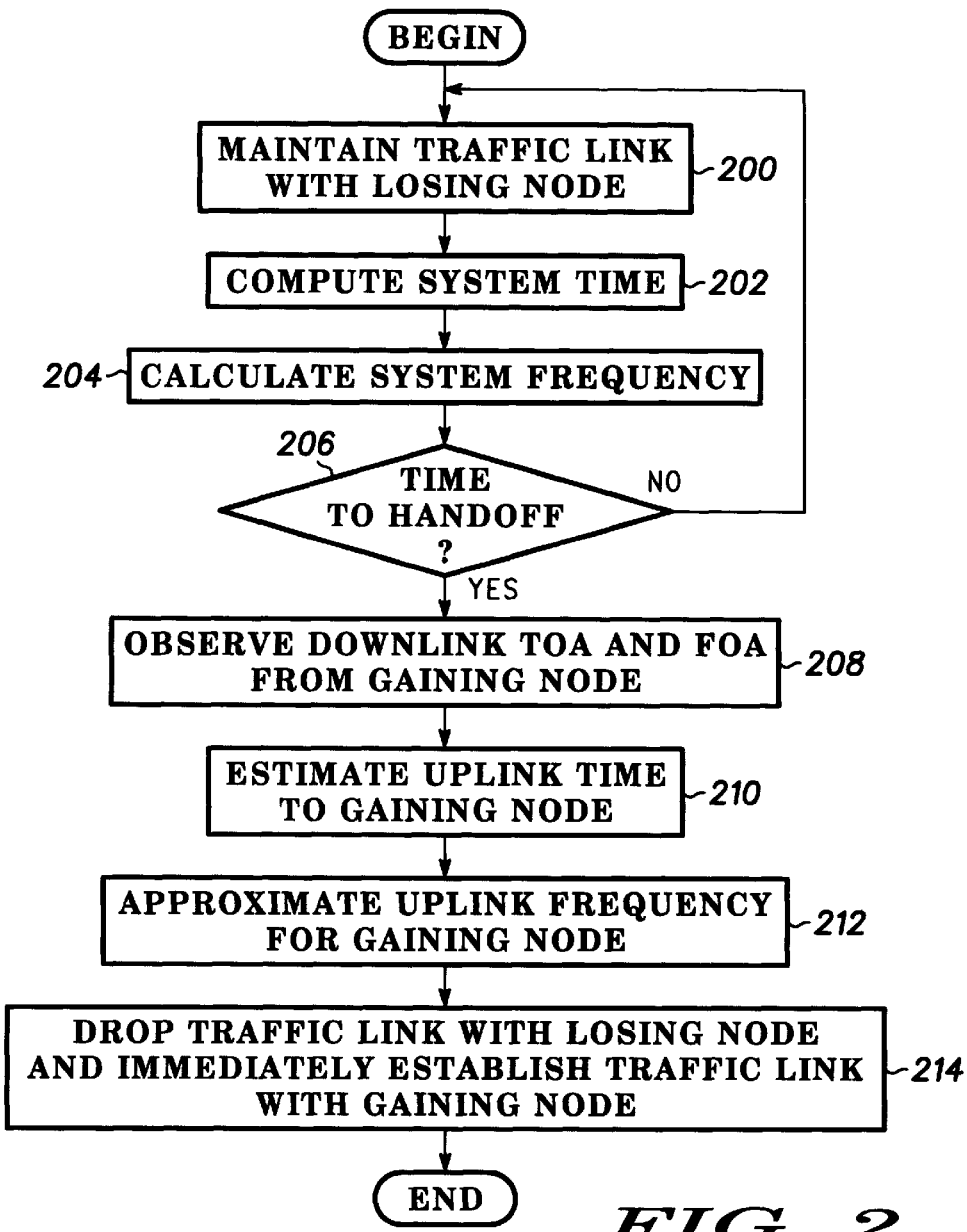
FIG. 2 illustrates a flowchart of a method for handing off a communication unit (CU) from a losing node to a gaining node in accordance with a preferred embodiment of the present invention.

FIG. 2 illustrates a flowchart of a method for handing off a CU from a losing node to a gaining node in accordance with a preferred embodiment of the present invention. The method is performed by a CU and begins when the step 200 of maintaining a traffic link with a losing node is occurring. Maintenance of the traffic link involves the exchange of uplink and/or downlink traffic packets between a CU (e.g., CU 110, FIG. 1) and a losing system node (e.g., satellite 120, FIG. 1).

As described previously, Doppler offset and propagation delay between a CU and a system node affect adjustments to a CU's transmit/receive frequency settings and transmit/receive times. Doppler offset is a function of the relative velocity of the system node to the CU. Because Doppler offset effects the perceived frequency of a signal, Doppler offset is relevant to the frequency at which a traffic packet is transmitted. Propagation delay is a function of the distance between the CU and the system node. Because a signal takes time to travel this distance, propagation delay is relevant to the time at which a traffic packet is transmitted.

As described previously, the CU and the losing/gaining nodes move relative to each other. This movement causes the Doppler offset and propagation delay to change with time. The Doppler offset and propagation delay relative to the losing node can be used to calculate the system time and system frequency.

In step 202, the system time is computed using measurements of the propagation delay between the CU and the losing node. Under normal tracking operations, the CU adjusts its downlink clock late relative to the losing node clock and its uplink clock early relative to the losing node clock to account for propagation delay. The CU measures the losing node downlink time (i.e., the time when the CU receives the losing node downlink signal) and the losing node uplink time (i.e., the time when the CU sends the losing node uplink signal). By taking an average of the losing node downlink time and uplink time, the CU can compute the losing node time. Because the system nodes are time-synchronized, the computed losing node time represents an accurate estimate of the system time.

In step 204, the system frequency is calculated using measurements of the Doppler offset between the CU and the losing node. Under normal tracking operations, the CU adjusts its downlink frequency relative to the losing node Doppler shifted carrier and its uplink frequency to compensate for Doppler offset such that the CU's transmission arrives on-frequency at the losing node. The CU measures the losing node downlink frequency (i.e., the frequency at which the CU receives the losing node downlink signal) and the losing node uplink frequency (i.e. the frequency at which the CU sends the losing node uplink signal). By taking an average of the adjusted losing node downlink and uplink frequencies, the CU can calculate the losing node frequency. Because the system nodes are frequency-synchronized, the calculated losing node frequency represents an accurate estimate of the system frequency. In alternate embodiments, the CU could use other analysis schemes over longer durations which might result in more accurate estimates of system time and frequency.

In alternate embodiments, the CU might not calculate either or both the system time and system frequency. For example, the CU might have knowledge of the system time and system frequency independent of any CU calculations (e.g., the system time and/or system frequency could be sent to the CU by a node)

A determination is made in step 206 whether a time to handoff has arrived. A time to handoff might arrive when, for example, the system sends a handoff order message to the CU. Alternatively, the CU might determine whether or not it wants to handoff, for example, based on varying signal qualities between system nodes, differing communication rates between system nodes (e.g., when the CU is handing off between different communication systems), or other criteria. When step 206 indicates that it is not time to handoff, the method iterates as shown in FIG. 2.

When step 206 indicates that it is time to initiate a handoff, the downlink time-of-arrival (TOA) and frequency-of-arrival (FOA) of a downlink signal emanating from the gaining node are observed by the CU receiver in step 208.

In a preferred embodiment, in order to handoff to the gaining node, the CU determines uplink signal parameters which describe the uplink signal to the gaining node. These parameters comprise the gaining node uplink time and the gaining node uplink frequency. The gaining node uplink time is a time at which the CU should transmit the gaining node uplink signal to the gaining node if the gaining node uplink signal is properly to be received at the gaining node. The gaining node uplink frequency is a frequency at which the CU should transmit the gaining node uplink signal to the gaining node if the gaining node uplink signal is properly to be received at the gaining node. In alternate embodiments, devices other than the CU can calculate the uplink signal parameters and send the uplink signal parameters to the CU.

In a preferred embodiment, steps 202 and 208 are precursors to estimating the gaining node uplink time. In step 210, the uplink time to the gaining node is estimated using the observed downlink TOA from step 208 and the system time computed in step 202. First, the propagation delay is derived by calculating a difference between the observed downlink TOA and the system time. Normally, the observed downlink TOA will be a time which is later than the system time by a time span equal to the propagation delay. The estimated gaining node uplink time, thus, is a time which is earlier than the system time by a time span equal to the propagation delay. In other words, the estimated gaining node uplink time is the system time adjusted by a negative of the difference between the observed downlink TOA and the system time.

As described previously, multiple synchronized system times could be employed by a communication system. For example, a communication system could use a time division multiple access (TDMA) communications protocol. In a TDMA system, multiple time slots are available to a CU and these multiple available time slots are synchronized between system nodes. An RF communication channel between a system node and a CU is at least partially defined by a particular time slot of the multiple available time slots. During handoff from a losing node to a gaining node, the time slot assigned for communications with the losing node often differs from the time slot assigned for communications with the gaining node. Where the time slots between nodes differ, the determination of the gaining node uplink time must take into account a time shift between the losing node and gaining node time slots. This time shift is equivalent to a time difference between the losing node and gaining node time slots. Thus, after the estimated gaining node uplink time is determined as described above, the estimated gaining node uplink time must be adjusted by the time shift in order to synchronize the CU to the assigned gaining node channel.

In a preferred embodiment, steps 204 and 208 are precursors to approximating the gaining node uplink frequency. In step 212, the uplink frequency for the gaining node is approximated using the observed downlink FOA and the system frequency calculated in step 204. First, the Doppler offset is determined by calculating a difference between the observed downlink FOA and the system frequency.

If the gaining node is approaching the CU, the observed downlink FOA normally will be a frequency which is higher than the system frequency by the Doppler offset, and the estimated gaining node uplink frequency will be a frequency which is lower than the system frequency by the Doppler offset. Consequently, if the gaining node is moving away from the CU, the observed downlink FOA normally will be a frequency which is lower than the system frequency by the Doppler offset, and the estimated gaining node uplink frequency will be a frequency which is higher than the system frequency by the Doppler offset. In other words, the approximated gaining node uplink frequency is the system frequency adjusted by a negative of the difference between the observed downlink FOA and the system frequency.

In alternate embodiments, the CU might not calculate either or both the gaining node uplink time and gaining node uplink frequency. For example, the CU might have knowledge of the gaining node uplink time and gaining node uplink frequency independent of any CU calculations (e.g., the gaining node uplink time and/or frequency could be sent to the CU by a node).

As described previously, multiple synchronized system frequencies could be employed by a communication system. For example, a communication system could use a frequency division multiple access (FDMA) communications protocol. In an FDMA system, multiple frequencies are available to a CU and these multiple available frequencies are synchronized between system nodes. An assigned RF communication channel between a system node and a CU is at least partially defined by a particular frequency of the multiple available frequencies. During handoff from a losing node to a gaining node, the frequency assigned for communications with the losing node often differs from the frequency assigned for communications with the gaining node. Where the frequencies between nodes differ, the determination of the gaining node uplink frequency must take into account a frequency shift between the losing node and gaining node frequencies. This frequency shift is equivalent to a frequency difference between the losing node and gaining node assigned frequencies. Thus, after the estimated gaining node uplink frequency is determined as described above, the estimated gaining node uplink frequency must be adjusted by the frequency shift in order to synchronize the CU to the assigned gaining node channel.

In a preferred embodiment, handoff from the losing node to the gaining node is based on the gaining node uplink time and gaining node uplink frequency. At the moment the handoff occurs, in step 214, the CU drops the traffic link with the losing node by ceasing communications with the losing node, immediately adjusts its uplink time and frequency to the values estimated in steps 210 and 212 (i.e., the gaining node uplink signal parameters), and establishes a traffic link with the gaining node by beginning to transmit uplink traffic packets to the gaining node at the estimated gaining node uplink time and frequency. Once the CU begins transmitting uplink packets to the gaining node, handoff is complete and the method ends.

As described previously, in a preferred embodiment, estimates of the system time and system frequency are derived by calculating averages of the losing node uplink/downlink times and uplink/downlink frequencies, respectively. Further, in a preferred embodiment, the derived system time and system frequency are used, along with an observed TOA and FOA of a signal from the gaining node, to form an estimate of the uplink time and frequency, respectively. In alternate embodiments, different methods of estimating the uplink time and frequency can be used. The particular method used is not crucial to the method and apparatus of the present invention. What is important is that estimates of the uplink time and frequency are made prior to handoff between the losing and gaining nodes. Therefore, the above embodiment for estimating the uplink time and frequency are not meant to limit the scope of the present invention.

Figure 3:
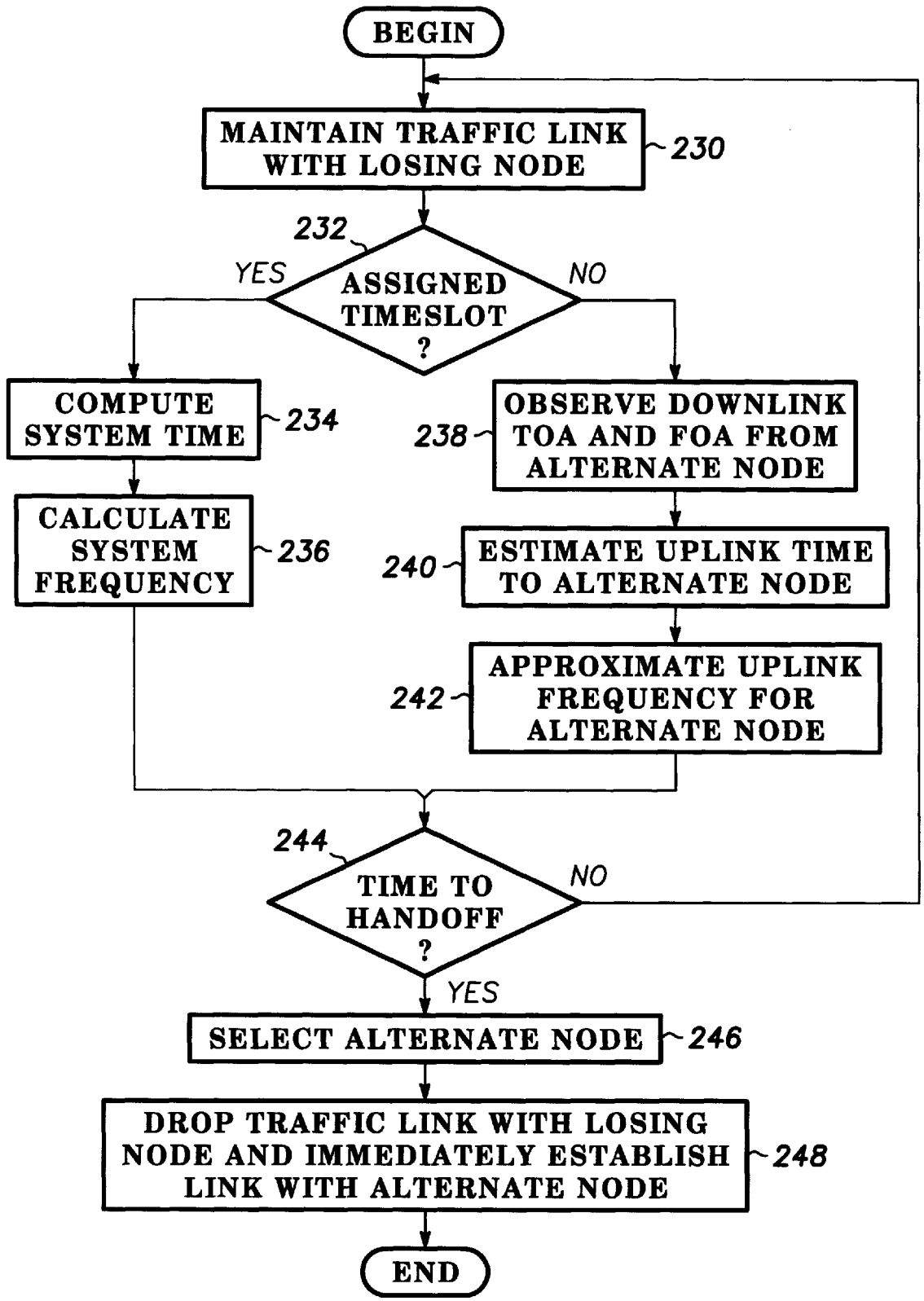
FIG. 3 illustrates a flowchart of a method for handing off a CU from a losing node to a gaining node in accordance with an alternate embodiment of the present invention.

FIG. 3 illustrates a flowchart of a method for handing off a CU from a losing node to a gaining node in accordance with an alternate embodiment of the present invention. The method illustrated in FIG. 3 is similar to the method illustrated in FIG. 2, except that the method of FIG. 3 enables calculation of handoff parameters for at least one alternate node to be performed before a time to handoff arrives. Basically, in a TDMA system, a CU communicates during selected timeslots and does not communicate during other timeslots. During those "unused" timeslots, the CU can precalculate handoff parameters for one or more alternate nodes. Then, when a time to handoff arrives, the CU can make a connection with one of the alternate nodes in a more immediate fashion.

The method is performed by a CU and begins when the step 230 of maintaining a traffic link with a losing node is occurring. Maintenance of the traffic link involves the exchange of uplink and/or downlink traffic packets between a CU (e.g., CU 110, FIG. 1) and a losing system node (e.g., satellite 120, FIG. 1) during an assigned uplink and/or downlink timeslot.

A decision is then made, in step 232, whether the current timeslot is a timeslot assigned for CU-to-losing node communications or whether the current timeslot is an unassigned, or unused, timeslot. If the current timeslot is an assigned timeslot, steps 234 and 236 are performed. If the current timeslot is an unused timeslot, steps 238–242 are performed.

In step 234, the system time is computed using measurements of the propagation delay between the CU and the losing node. This step is desirably performed in a manner similar to step 202 of FIG. 2. In step 236, the system frequency is calculated using measurements of the Doppler offset between the CU and the losing node. This step is desirably performed in a manner similar to step 204 of FIG. 2. In alternate embodiments, the CU might not calculate either or both the system time and system frequency. For example, the CU might have knowledge of the system time and system frequency independent of any CU calculations (e.g., the system time and/or system frequency could be sent to the CU by a node). Step 244 is then performed, as will be described below.

If the current timeslot is an unused timeslot, as determined in step 232, then step 238 is performed, in which, the downlink time-of-arrival (TOA) and frequency-of-arrival (FOA) of a downlink signal emanating from an alternate node are observed by the CU receiver. This step is desirably performed in a manner similar to step 208 of FIG. 2. In step 240, the uplink time to the alternate node is estimated using the observed downlink TOA from step 238 and the system time computed in a previous iteration of step 232. This step is desirably performed in a manner similar to step 210 of FIG. 2. In step 242, the uplink frequency for the alternate node is approximated using the observed downlink FOA and the system frequency calculated in a previous iteration of step 234. This step is desirably performed in a manner similar to step 212 of FIG. 2.

Step 244 is then performed, in which a determination is made whether a time to handoff has arrived. When step 244 indicates that it is not time to handoff, the method iterates as shown in FIG. 3. In the case where more than one alternate node may be available to the CU, the next iteration of steps 238 through 242 can be performed for a different alternate node. If so, the estimated uplink times and uplink frequencies for the alternate nodes are desirably stored until a time to handoff arrives. In one alternate embodiment, calculations for more than one alternate node can be performed sequentially during the same unused timeslot. In another alternate embodiment, not all unused timeslots could be used to calculate parameters for an alternate node.

If a time to handoff has arrived, as determined in step 244, a decision is made in step 246 regarding to which alternate node the CU should handoff. If the method does not calculate handoff parameters for multiple alternate nodes, step 246 could be skipped or eliminated. If only one alternate node exists, the CU would handoff to that node. If multiple alternate nodes exist and the method calculates handoff parameters for the multiple alternate nodes, various criteria could be used to determine to which alternate node the CU should handoff. In one embodiment, the CU could be instructed to handoff to the alternate node which has the highest signal power level.

In another embodiment, the CU could be instructed to handoff to the alternate node which has a more desirable physical location and/or trajectory. For example, a first alternate node may be closer to the CU than a second alternate node, but the first alternate node may be moving away from the CU, whereas the second alternate node may be moving toward the CU. This would indicate that a link between the CU and the second alternate node would be able to be maintained longer than a link between the CU and the first alternate node. Thus, the second alternate node may be a more desirable alternative than the first alternate node.

Several other location and/or trajectory criteria could be used to determine which alternate node is the most desirable. These may include, but are not limited to, selecting the highest node in the sky or selecting the node which would enable the longest maintained link. Other criteria may also be used. For example, the CU (or the system) may have information indicating the amount of traffic which each node is supporting and/or the likelihood that a channel will be available to the CU. The CU may be handed off to a node that is supporting less traffic, or a node that has a higher likelihood of channel availability. Alternatively, the CU (or the system) may have information indicating the health of the nodes or the available power for each node. These types of information also could be used to help determine which alternate node is the most desirable.

If a selection criteria is the location and/or trajectory of the alternate node, then information collected during iterations of steps 238 through 242 can be used to evaluate candidate handoff nodes. Information on the node location can be obtained using the TOA calculations and information on the trajectory can be obtained using the FOA calculations.

Location information, in the form of the alternate node's elevation angle, $\Omega$, can be determined using the alternate node's observed downlink TOA. The observed downlink TOA is approximately the sum of the system time and the propagation time, Tp, which is the time it takes a signal to travel from the alternate node to the CU. By subtracting the system time from the observed downlink TOA, the propagation time can be estimated. The approximate distance between the CU and the satellite, $R_s$, is the product of Tp and the speed of light. From this information, sin ($\Omega$) can be determined using the following equation.

$$\sin(\Omega) = \frac{R_{SM}^2 - R_S^2 - (R_e + h)^2}{2(R_e + h)R_S}$$

where $R_{SM}$ is the distance between the center of the earth and the node, $R_e$ is the radius of the earth, and h is the altitude of the CU above sea level. The angle of elevation, $\Omega$, can then be used, either alone or using other criteria, to select the most desired alternate node.

As explained previously, if the alternate node is approaching the CU, the observed downlink FOA normally will be a frequency which is higher than the system frequency by the Doppler offset, and the estimated alternate node uplink frequency will be a frequency which is lower than the system frequency by the Doppler offset. Consequently, if the alternate node is moving away from the CU, the observed downlink FOA normally will be a frequency which is lower than the system frequency by the Doppler offset, and the estimated alternate node uplink frequency will be a frequency which is higher than the system frequency by the Doppler offset. Whether or not the alternate node is moving away or coming toward the CU (and/or how fast), can then be used, either alone or using other criteria, to select the most desired alternate node.

After the alternate node is selected, handoff from the losing node to the gaining node occurs in step 248. Handoff is based on the gaining node uplink time and gaining node uplink frequency. At the moment the handoff occurs, the CU drops the traffic link with the losing node by ceasing communications with the losing node, immediately adjusts its uplink time and frequency to the values estimated in steps 240 and 242 (i.e., the selected alternate node uplink signal parameters), and establishes a traffic link with the alternate node by beginning to transmit uplink traffic packets to the alternate node at the estimated alternate node uplink time and frequency. Once the CU begins transmitting uplink packets to the alternate node, handoff is complete and the method ends.

Figure 4:
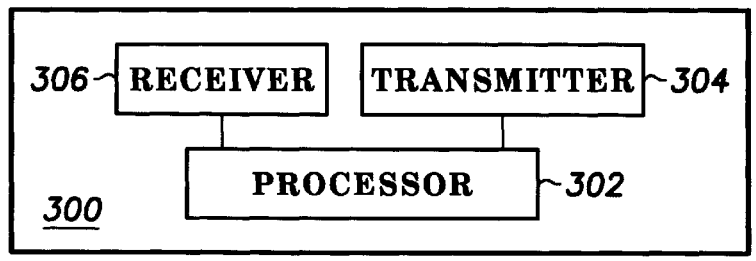
FIG. 4 illustrates a block diagram of a CU in accordance with a preferred embodiment of the present invention.

FIG. 4 illustrates a block diagram of CU 300 in accordance with a preferred embodiment of the present invention. CU 300 comprises processor 302, RF transmitter 304, and RF receiver 306. RF transmitter 304 and RF receiver 306 are used to transmit RF signals to and receive RF signals from a system node.

When a signal is received from a system node by RF receiver 306, RF receiver 306 can measure Doppler offset and TOA relative to the system node. From the TOA, processor 302 is capable of computing the propagation delay between CU 300 and the system node. The Doppler offset and propagation delay relative to the losing node enable processor 302 to compute the system time and system frequency.

When the necessity for a handoff arises, processor 302 commands RF receiver 306 to observe the downlink TOA and FOA of a signal from a gaining or alternate system node. Using the observed downlink TOA and FOA, and the computed system time and frequency, processor 302 calculates the propagation delay to the gaining or alternate node. The Doppler offset and propagation delay enable processor 302 to estimate the uplink time and frequency to the gaining or alternate node.

Processor 302 can then simultaneously drop the traffic link with the losing node and establish a traffic link with a gaining or alternate node using the estimated gaining node uplink time and frequency. Thus, the CU transmitter does not need to send an uplink signal to the losing node and the gaining or alternate node simultaneously. This enables a CU handoff from a losing node to a gaining or alternate node using one set of uplink communications equipment for both the uplink signal to the losing node and the uplink signal to the gaining or alternate node.

The method and apparatus of the present invention achieves the results that no uplink traffic packets are dropped during a handoff and CU 300 is not required to maintain two uplink traffic channels during handoff. In alternate embodiments, the functions performed by processor 302 and RF receiver 306 could be performed by multiple and/or different processors (not shown) within CU 300.

In summary, the method and apparatus of the present invention eliminates the need to perform a synchronization procedure prior to handing off to a gaining or alternate node. This enables a CU handoff to occur without having to support traffic channels with both the gaining or alternate and losing nodes and also without dropping uplink traffic packets. Thus, the method and apparatus of the present invention enables handoff to occur without the need for additional CU hardware and also without impacting voice and/or data quality.

While the principles of the invention have been described above in connection with specific apparatus, it is to be clearly understood that this description is made only by way of example and not as a limitation on the scope of the invention.

What is claimed is:

1. A method for a communication unit (CU) to hand off from a first node to a second node, wherein the CU is a radio frequency device capable of communicating with a node during an assigned timeslot using an uplink signal from the CU to the node and a downlink signal from the node to the CU, the method comprising the steps of:
   a) estimating a second node uplink time at which the CU should transmit the uplink signal to the second node, wherein an estimation of the alternate node uplink time is based on measurements performed during a timeslot other than the assigned timeslot;
   b) approximating a second node uplink frequency at which the CU should transmit the uplink signal to the second node, wherein an approximation of the second node uplink frequency is based on measurements performed during a timeslot other than the assigned timeslot; and
   c) handing off from the first node to the second node using the second node uplink time and the second node uplink frequency.

2. The method as claimed in claim 1, wherein the step of estimating the second node uplink time comprises the steps of:
   a1) computing a system time to which the first node and the second node are synchronized;
   a2) observing a second node time-of-arrival (TOA) of a second node downlink signal;
   a3) calculating a difference between the system time and the second node TOA; and
   a4) estimating the second node uplink time as the system time adjusted by a negative of the difference.

3. The method as claimed in claim 1, wherein the step of approximating the second node uplink frequency comprises the steps of:
   b1) calculating a system frequency at which the first node and the second node are synchronized;
   b2) observing a second node frequency-of-arrival (FOA) of a second node downlink signal;
   b3) determining a difference between the system frequency and the second node FOA; and
   b4) approximating the second node uplink frequency as the system frequency adjusted by a negative of the difference.

4. The method as claimed in claim 1, wherein the step of estimating the second node uplink time comprises the steps of:
   a1) deriving a propagation delay between the CU and the second node; and
   a2) estimating the second node uplink time as a system time to which the first node and the second node are synchronized adjusted by the propagation delay.

5. The method as claimed in claim 1, wherein the step of approximating the second node uplink frequency comprises the steps of:
   b1) determining a Doppler offset between the CU and the second node; and
   b2) approximating the second node uplink frequency as a system frequency to which the first node and the second node are synchronized adjusted by the Doppler offset.

6. The method as claimed in claim 1, wherein the step of handing off from the first node to the second node comprises the step of ceasing communications with the first node and immediately beginning to communicate with the second node at the second node uplink time and using the second node uplink frequency.

7. A method for a communication unit (CU) to hand off from a first node to a second node, wherein the CU is a radio frequency device capable of communicating with a node during an assigned timeslot using an uplink signal from the CU to the node and a downlink signal from the node to the CU, the method comprising the steps of:
   a) estimating an alternate node uplink time for at least one alternate node other than the first node, wherein the alternate node uplink time for a particular alternate node is a time at which the CU should transmit the uplink signal to the particular alternate node, and an estimation of the alternate node uplink time is based on measurements performed during a timeslot other than the assigned timeslot;
   b) approximating an alternate node uplink frequency for at least one alternate node, wherein the alternate node uplink frequency for the particular alternate node is a frequency at which the CU should transmit the uplink signal to the particular alternate node, and an approximation of the alternate node uplink frequency is based on measurements performed during the timeslot other than the assigned timeslot; and
   c) handing off from the first node to a node of the at least one alternate node using the alternate node uplink time and the alternate node uplink frequency for the node.

8. The method as claimed in claim 7, wherein the step of estimating comprises the steps of:
   a1) estimating a first alternate node uplink time for a first alternate node; and
   a2) estimating other alternate node uplink times for at least one additional alternate node.

9. The method as claimed in claim 8, further comprising the step of:
   d) selecting the node of the first alternate node and the at least one additional alternate node to which the CU will hand off.

10. The method as claimed in claim 9, wherein the step of selecting comprises the step of selecting the node based on which of the first alternate node and the at least one additional alternate node has a highest signal power level.

11. The method as claimed in claim 9, wherein the step of selecting comprises the step of selecting the node based on whether the first alternate node and the at least one additional alternate node is approaching the CU.

12. The method as claimed in claim 9, wherein the step of selecting comprises the step of selecting the node based on angles of elevation of the first alternate node and the at least one additional alternate node.

13. A communication unit (CU) capable of communicating with a node during an assigned timeslot using radio frequency (RF) links comprising an uplink signal from the CU to the node and a downlink signal from the node to the CU, wherein the CU is also capable of handing off communications from a first node to a second node, the CU comprising:

an RF transmitter for sending a first uplink signal to the first node and for sending a second uplink signal to the second node, wherein the CU does not send the first uplink signal and the second uplink signal simultaneously;

an RF receiver for receiving a first downlink signal from the first node and for receiving a second downlink signal from the second node; and a processor coupled to the RF transmitter and the RF receiver, the processor for estimating an uplink time to send the second uplink signal, for approximating an uplink frequency to send the second uplink signal and, wherein the estimating and approximating steps are based on measurements performed during a timeslot other than the assigned timeslot, when a handoff from the first node to the second node is to occur, the processor is further for ceasing to send the first uplink signal and for immediately sending the second uplink signal at the uplink time and using the uplink frequency.

* * * * *